United States Patent
White (10) Patent No.: US 11,587,420 B2
(45) Date of Patent: Feb. 21, 2023

(54) SYSTEMS AND METHODS OF COMBINING RFID AND VMS FOR PEOPLE TRACKING AND INTRUSION DETECTION

(71) Applicant: Sensormatic Electronics, LLC, Boca Raton, FL (US)

(72) Inventor: Ross White, Fishers, IN (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/353,866

(22) Filed: Mar. 14, 2019

(65) Prior Publication Data

US 2020/0294377 A1    Sep. 17, 2020

(51) Int. Cl.
| | | |
|---|---|---|
| G08B 13/196 | (2006.01) | |
| H04N 5/272 | (2006.01) | |
| H04N 5/247 | (2006.01) | |
| G06K 7/10 | (2006.01) | |
| G06K 19/07 | (2006.01) | |

(52) U.S. Cl.
CPC ... *G08B 13/19691* (2013.01); *G06K 7/10475* (2013.01); *G06K 19/0723* (2013.01); *H04N 5/247* (2013.01); *H04N 5/272* (2013.01)

(58) Field of Classification Search
CPC ............ G08B 13/19691; G08B 13/248; G06K 7/10475; G06K 19/0723; G06K 7/10009; H04N 5/247; H04N 5/272; H04N 7/181
See application file for complete search history.

(56) References Cited

U.S. PATENT DOCUMENTS

| | | | | |
|---|---|---|---|---|
| 8,719,038 B1 * | 5/2014 | Gazdzinski | ........ | G06Q 30/0264 704/7 |
| 2003/0085992 A1 * | 5/2003 | Arpa | ..................... | G06T 19/006 348/E7.086 |
| 2004/0105006 A1 * | 6/2004 | Lazo | ..................... | G01S 3/7864 348/169 |
| 2004/0169587 A1 * | 9/2004 | Washington | ....... | G06K 7/10079 340/572.1 |
| 2007/0182818 A1 * | 8/2007 | Buehler | ........... | G08B 13/19641 348/143 |
| 2007/0279214 A1 * | 12/2007 | Buehler | ........... | G08B 13/19697 340/521 |
| 2008/0231448 A1 * | 9/2008 | Fowler | ............... | G08B 13/2462 340/572.1 |

(Continued)

*Primary Examiner* — Robert J Hance
(74) *Attorney, Agent, or Firm* — Foley & Lardner LLP (57) ABSTRACT

A system of identifying and tracking occupants of a building is provided. The system includes multiple detector devices that each receive an identification signal from an identification device and multiple image capture devices that each output an image signal depicting a respective monitored location of the building. The system further includes a processing circuit that receives the identification signal from one of the detector devices, associates the detector device with a detector location, retrieves a user attribute, and receives the image signal from one of the image capture devices depicting a monitored location corresponding to the detector location. The processing circuit further generates an annotated video signal including the user attribute overlaid on the video signal, and displays the annotated video signal on a display device.

17 Claims, 4 Drawing Sheets

(56) References Cited

U.S. PATENT DOCUMENTS

| | | | |
|---|---|---|---|
| 2010/0257448 A1* | 10/2010 | Squires | H04N 7/162 |
| | | | 715/717 |
| 2010/0318566 A1* | 12/2010 | Yoshio | G08B 13/19671 |
| | | | 707/774 |
| 2013/0093897 A1* | 4/2013 | Fan | H04N 21/25841 |
| | | | 348/E7.085 |
| 2016/0225241 A1* | 8/2016 | Jones, Jr. | G08B 25/14 |
| 2016/0295086 A1* | 10/2016 | Bhat | G06T 7/0012 |
| 2016/0337619 A1 | 11/2016 | Renkis | |
| 2017/0345268 A1* | 11/2017 | Cho | H04N 5/765 |
| 2018/0068541 A1* | 3/2018 | Almomani | G08B 25/10 |
| 2018/0234665 A1* | 8/2018 | Shim | G08B 13/19682 |
| 2018/0247070 A1* | 8/2018 | Evans | G08B 25/12 |
| 2019/0285748 A1* | 9/2019 | DeVries | G01S 17/04 |

\* cited by examiner

SYSTEMS AND METHODS OF COMBINING RFID AND VMS FOR PEOPLE TRACKING AND INTRUSION DETECTION

BACKGROUND

Buildings such as, for example, commercial buildings, residential buildings, high-rise buildings, hotels, schools etc. typically use large building control systems such as fire detection systems, heating, ventilation, and air conditioning (HVAC) systems, access control systems, and video surveillance systems.

SUMMARY

At least one aspect is directed to a system of identifying and tracking occupants of a building. The system includes multiple detector devices that each receive an identification signal from an identification device and multiple image capture devices that each output an image signal depicting a respective monitored location of the building. The system further includes a processing circuit that receives the identification signal from one of the detector devices, associates the detector device with a detector location, retrieves a user attribute, and receives the image signal from one of the image capture devices depicting a monitored location corresponding to the detector location. The processing circuit further generates an annotated video signal including the user attribute overlaid on the video signal, and displays the annotated video signal on a display device.

At least one aspect is directed to a computer implemented method of identifying and tracking occupants of a building. The method includes receiving an identification signal from a detector including an identifier, associating the detector device providing the identification signal with a detector location of the building, and retrieving a user record including user attributes corresponding to the identifier. The method further includes receiving a video signal from an image capture device depicting a monitored location corresponding to the detector location, generating an annotated video signal including a user attribute overlaid on the video signal, and displaying the annotated video signal on a display device.

At least one aspect is directed to a building monitoring apparatus. The building monitoring apparatus includes a display that presents a user interface having an array of inputs, and a monitoring circuit coupled to the display. The monitoring circuit includes a detector database configured to receive an identification signal and store location identifiers associated with detector devices, an image capture database configured to receive a video signal and store location identifiers associated with image capture devices, and a subject database configured to extract identification data regarding a person or an object based on the identification signal. The monitoring circuit further includes an output generator configured to generate annotated display data for the display based on the identification data, a detector device location identifier, and an image capture device location identifier.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

The present disclosure relates generally to the field of building management systems, and more particularly to systems and methods utilizing long range RFID readers in concert with video monitoring software to triangulate the position of a person or object within a designated environment. Embodiments of a building management system running a computer program for providing enhanced capabilities to assist with video monitoring will now be described more fully hereinafter with reference to the accompanying drawings, in which illustrative embodiments of the present disclosure are presented. The building management system of the present disclosure may be embodied in many different forms and should not be construed as being limited to the embodiments set forth herein. Rather, these embodiments are provided so that this disclosure will convey certain example aspects of the building management system.

Although large building control systems can exhibit a significant degree of control over many conditions of the building, it can be difficult to identify occupants and objects moving within the building on video captured by surveillance systems without the use of sophisticated facial and/or object recognition systems. Systems and methods in accordance with the present disclosure can facilitate integration of RFID tracking and video monitoring systems to generate annotated images that can either be viewed live by building security personnel or stored for later viewing. Systems and methods in accordance with the present disclosure can supplement current RFID asset tracking and VMS technologies to more easily identify the people and objects moving through a building space, which can improve building security. The systems and methods of the present disclosure could be implemented in a school setting for attendance tracking and intruder detection, a retail setting for loss prevention, or any building for the purpose of forensic investigations.

Figure 1:
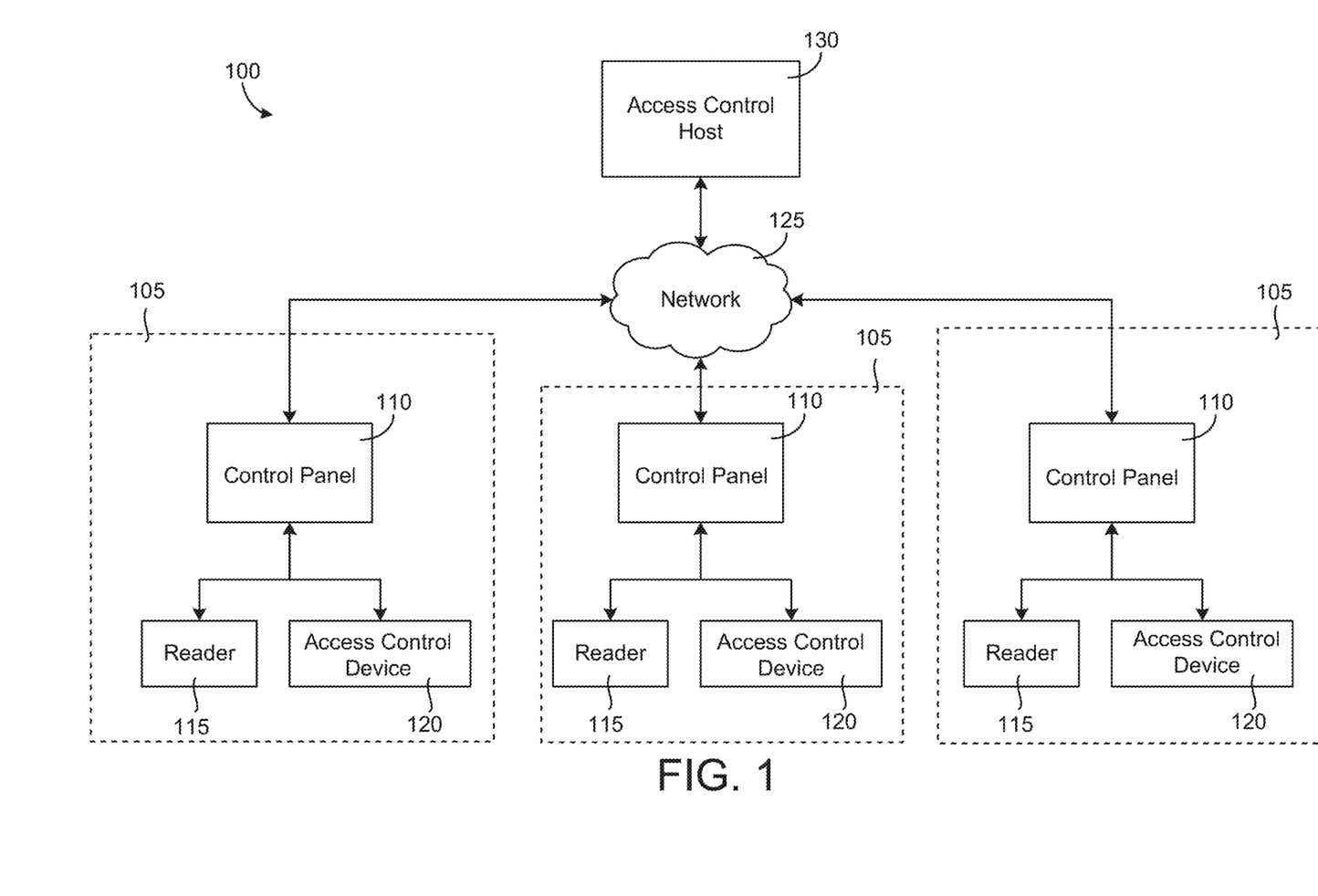
FIG. 1 is a block diagram of an access control system, according to some embodiments.

Referring now to FIG. 1, an access control system 100 is depicted. Access control system 100 monitors and controls access to various locations in or around a building (e.g., rooms or zones in a building, parking structures, etc.) using a collection of access control points 105. Each access control point 105 is shown to include a physical control panel 110, a reader 115, and an access control device 120. Physical control panels 110 can be connected to readers 115 and access control devices 120 via a hardwired serial connection (e.g., RS-485 serial communication lines) or a wireless connection.

Readers 115 can receive credential data from a user via an access control card of a user. For example, readers 115 can read a smartcard (e.g., in integrated circuit card) possessed by a user to automatically obtain a smartcard ID from the smart card. In other instances, the readers 115 can read RFID tag devices (e.g., RFID wrist strap, RFID bag tag) possessed by a user to obtain an identifier from the tag device.

Access control devices 120 can include electronic locks, actuators, or other controllable devices that can be operated to automatically grant or deny access through the access control points. For example, a door access control point can include an electronic lock configured to lock and unlock the door in response to a control signal from the physical control panel. In some embodiments, access control devices 120 are distributed throughout a building or campus (i.e., a group of buildings). Each access control device 120 can be configured to control a particular access point (e.g., a doorway, an elevator, a parking structure, a building entrance or exit, etc.).

User interactions with readers 115 (i.e., access requests) can be recorded as events and sent to access control host 130 via a communications network 125 (e.g., a TCP/IP network, a building automation and control network, a LAN, a WAN, etc.). Each event may include, for example, a timestamp, a device ID identifying the access control device 120, a security credential provided by the user at the access point (e.g., a smartcard ID, an access code, etc.), a user ID, and/or any other information describing the access request. Access control host 130 can process the events and determine whether to allow or deny the access request. In some embodiments, access control host 130 accesses a security database to determine whether the security credential provided by the user matches a stored security credential. In some embodiments, access control host 130 determines whether the user associated with the access request (e.g., defined by the user ID or smartcard ID) is authorized to access the area controlled by the access control device 120. In some embodiments, access control host 130 displays an alarm or prompt for a security workstation (e.g., a computer operated by security personnel) to allow or deny the access request.

Figure 2:
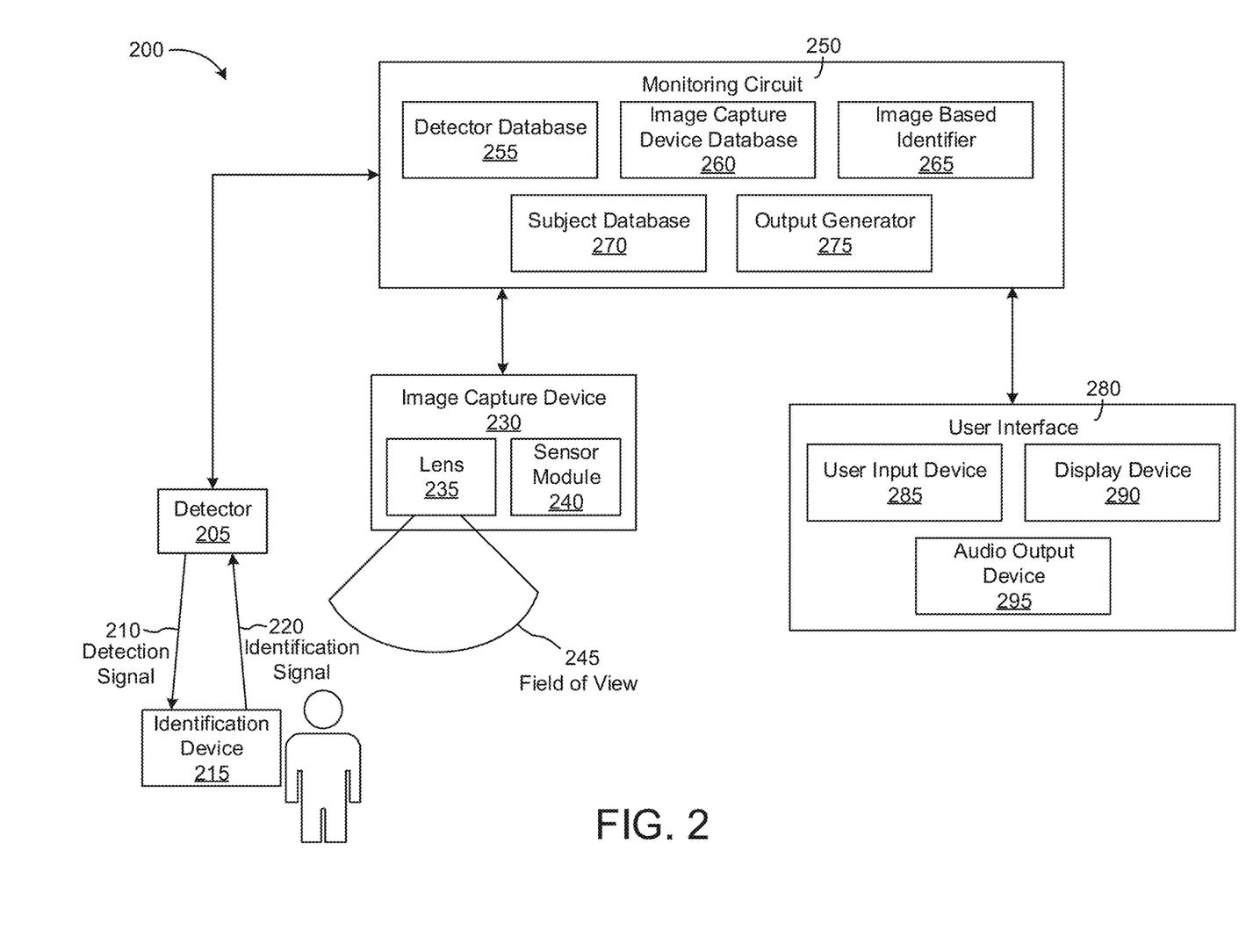
FIG. 2 is a block diagram of a building management system (BMS) with long range radio frequency identification (RFID) tracking integration into video monitoring software (VMS), according to some embodiments.

Referring now to FIG. 2, a building monitoring system (BMS) 200 is depicted. The BMS 200 can incorporate features of the access control system 100 described with reference to FIG. 1. In addition, the BMS 200 can use RFID and/or video monitoring solutions to accurately and responsively identify and monitor the locations of people and objects in a building.

The BMS 200 can include multiple detectors 205. The detectors 205 can be positioned at various locations in a building. In some instances, the detectors 205 are positioned in proximity to access control points (e.g., access control point 105). In other instances, the detectors 205 are the readers (e.g., reader 115) of the access control points. The detectors 205 can be installed in locations at which traffic may be expected to flow through the building. In some embodiments, the detectors 205 can be positioned relatively far from existing movement pathways, enabling the detectors 205 to monitor people and objects that may be circumventing existing movement pathways or attempting to access restricted areas of the building.

Each detector 205 can output a detection signal 210. In other words, the detector 205 can function as a beacon device. The detection signal 210 can cause an identification device 215 to transmit an identification signal 220 responsive to receiving the detection signal 210. In some instances, the detector 205 emits the detection signal 210 continuously. In other instances, the detector 205 emits the detection signal at regular intervals (e.g., every 3-5 seconds).

The identification signal 220 can include an identifier, such as an identifier of the identification device 215 and/or of a user of the identification device 215. For example, the identifier can include one or more of the following: the name of the user, an employee number assigned to the user, a building occupant number assigned to the user, a security level assigned to the user, and a serial number of the identification device 215. In other instances, the identification device 215 can be associated with an object, rather than a user. For example, if the BMS 200 is implemented in a hospital, the identification device 215 can be affixed to a piece of movable equipment, such as a wheelchair or a medication-dispensing cart. Each detector 205 can receive the identification signal 220. Each detector 205 can retransmit the identification signal 215 to a remote device (e.g., monitoring circuit 250 as described below) and/or extract, from the identification signal 215, the identifier and provide the identifier to the remote device. Each detector 205 can communicate with the remote device using any suitable wired or wireless connection.

The detectors 205 can include RFID detectors. For example, each detector 205 can output the detection signal 210 as a radio frequency signal (e.g., according to an RFID protocol). The identification devices 215 can be RFID devices (e.g., RFID tag, RFID card) that output the identification signal 220 as a radio frequency signal. In some instances, the identification devices 215 can be active RFID devices that use a power supply (e.g., a battery) to generate and transmit the identification signal 220. In other instances, the identification devices 215 can be passive RFID devices that use power from the detection signal 210 to activate a transmitter of the identification device 215 to transmit the identification signal 220.

The transmission range of each identification device 215 can be related to the frequency of the emitted identification signal 220. In general, higher frequency signals have shorter, higher-energy wavelengths and longer transmission ranges. For example, in some instances, the identification device 215 can have a transmission range of up to 300 feet or more. In other instances, the identification device 215 can have a transmission range of 10 feet or less. The transmission range of each identification device 215 can also be related to the RFID device style. For example, active RFID devices can have longer transmission ranges than passive RFID devices.

The BMS 200 can further include multiple image capture devices 230. Each image capture device 230 can include a lens 235 and a sensor module 240 that receives light via the lens 235. In various instances, the sensor module 240 can include visible light sensors, infrared sensors, or any other suitable type of sensor. The sensor module 240 then outputs one or more images corresponding to the received light. The lens 235 of the image capture device 230 can define a field of view 245 representative of the area that is able to be captured by the lens 235. The geometry of the field of view 245 can depend on the properties (e.g., focal length) of the lens 235. In some instances, the image capture device 230 and the corresponding field of view 245 is stationary. In other instances, the image capture device 230 can be moved between various positions, and the field of view 245 is variable based on the position of the image capture device 230.

The image capture device 230 can output the one more images to a remote device (e.g., monitoring circuit 250) as a video stream using any suitable wired or wireless connection. In some instances, the image capture device 230 can provide a timestamp with each image indicating a time of image capture. The image capture device 230 can output the video stream to the remote device on a continuous basis. Alternatively, the image capture device 230 can store the video stream as discrete files in a database and output the files at specified intervals or the satisfaction of certain conditions (e.g., file request from a remote device).

Still referring to FIG. 2, the BMS 200 is shown to include a monitoring circuit 250. The monitoring circuit 250 can receive identification data from the detectors 205 and the one or more images from the image capture devices 230. In response to receipt of this data, the monitoring circuit 250 can output modified images using the identification data and the one or more images. In some instances, the monitoring circuit 250 can be a subsystem of a BMS controller. In other instances, the monitoring circuit 250 can be a component of a security workstation (e.g., a computer operated by security personnel).

The monitoring circuit 250 can include a detector database 255. The monitoring circuit 250 can maintain, in the detector database 255, a predetermined location assigned to each detector 205. In some instances, the detector database 255 can store a detector record for each detector 205 with a serial device number or other device identifier and a location number or string used to identify the location where the detector 205 is installed. For example, a sample detector record can have the form "Detector1234—Exterior Door 1" to indicate that a detector 205 having a serial device number 12345 is installed near Exterior Door 1 of the building. In other instances, the detector record can have any suitable or desired format.

In addition to storing the detector records, the detector database 255 can receive the identification signal 220 transmitted by the identification device 215 and retransmitted by the detector 205. For example, the identification signal 220 can include an identifier of the identification device 215 associated with a user or an object. Upon receipt of the identification signal 220, the detector database 255 can store a user or an object record including the identifier and the detector record. For example, a sample user/object record can have the form "User123—Detector12345—Exterior Door 1" to indicate that the identification device 215 of a user identified by employee number 123 was detected by a detector 205 having a serial device number 12345 that is installed near Exterior Door 1 of the building. In some instances, the identification signal 220 further includes a timestamp indicating the time at which the identification device 215 encountered the detector 205. Alternatively, the detector database 255 can add a timestamp upon creation of the user/object record.

The monitoring circuit 250 includes an image capture device database 260. The monitoring circuit 250 can maintain, in the image capture device database 260, a predetermined location assigned to each image capture device 230. In some instances, the image capture device database 260 can store an image capture device record for each image capture device 230 with a serial device number or other device identifier and a location number or string used to identify the location where the image capture device 230 is installed. For example, a sample image capture device record can have the form "Camera12345—Hallway 1" to indicate that an image capture device 230 having a serial device number 12345 is installed to capture images of Hallway 1 of the building. In other instances, the image capture record can have any suitable or desired format.

In addition to storing the image capture device records, the image capture device database 260 can receive the images of the video stream and/or video file transmitted by the image capture device 230. Upon receipt of the video stream, the image capture device database 260 can store a video stream record including the video stream and the image capture device record. For example, a sample video stream record can have a record name of "VideoStream1—Camera12345—Hallway 1" to indicate that the images of the file VideoStream1 depict Hallway 1 in the building.

In some instances, the monitoring circuit 250 includes an image-based identifier 265. The image-based identifier 265 can execute various identification algorithms to extract an identity of a user and/or object from the one or more images received and stored by the image capture device database 260. In some instances, the image-based identifier 265 executes a facial recognition algorithm to identify a person in the one or more images. For example, the image-based identifier 265 can be particularly useful in a scenario in which multiple users with identification devices 215 encounter a detector 205 at substantially (e.g., within a few seconds) the same time and the multiple users are all within the field of view 245 of the same image capture device 230. In other instances, the image-based identifier 265 can execute an object recognition algorithm to identify an object in the one or more images.

The monitoring circuit 250 further includes a subject database 270. The subject database 270 may store records containing user and/or object attributes. For example, user attributes can include, but are not limited to, a user name, a user building destination (which could be used to identify a user entering a building zone where the user is not permitted), a user employment status, a user disability status (which can be useful information in the event of a building evacuation), a user food or drug allergy status, and a user security level. Object attributes can include, but are not limited to, an object name or other identifier, an object building destination, an object chemical identifier or Globally Harmonized System (GHS) label (which could be used by emergency responders and safety personnel to identify hazardous objects), an object weight, an object volume, an object examination date, and an object storage location. The user and object attributes can be added to and edited within the subject database 270 by a technician or building supervisor of the BMS 200. In some instances, the user and/or object attributes can be used to annotate a video file stored in the image capture device database 260. In still further instances, the subject database 270 can include records correlating the locations of detectors 205 and image capture devices 230. For example, the subject database 270 might store records indicating that Camera12345 installed in Hallway 1 includes Detector12345 installed near Exterior Door 1 within its field of view 245.

The monitoring circuit 250 includes an output generator 275. The output generator 275 generates annotated display data based on user and/or object records stored in the detector database 255, video stream records stored in the image capture device database 260, and user and/or object attributes stored in the subject database 270. In some instances, the output generator 275 generates the annotated video according to a process described in FIG. 4 below. In some instances, the output generator 275 can include a position calculator. The position calculator can include an algorithm or other computational engine that predicts the movement of the use or object within the field of view 245 of the image capture device 230, and between the locations of detectors 205 and image capture devices 230.

The BMS 200 also includes a user interface 280. The user interface 280 can be communicably coupled to the monitoring circuit 250 using any suitable wired or wireless connection. In some instances, the user interface 280 can be integrated with a BMS controller. In other instances, the user interface 280 can be a component of a security workstation. In still further instances, the user interface 280 may be a component of another computing device operated by security or building management personnel (e.g., a laptop, a tablet, a mobile device, a smartphone).

The user interface 280 can include a user input device 285, a display device 290, and an audio output device 295. The user input device 285 can include any component that facilitates a user interaction with the user interface 280. For example, the user input device 285 can include a keyboard, a mouse, a trackpad, or a touchscreen. The display device 390 can any component that is able to present an image or series of images for viewing. For example, the display device 290 can include an LCD or CRT display. The audio output device 295 can include any component that emits a sound. For example, the audio output device 295 can be a speaker or headphones.

Figure 3:
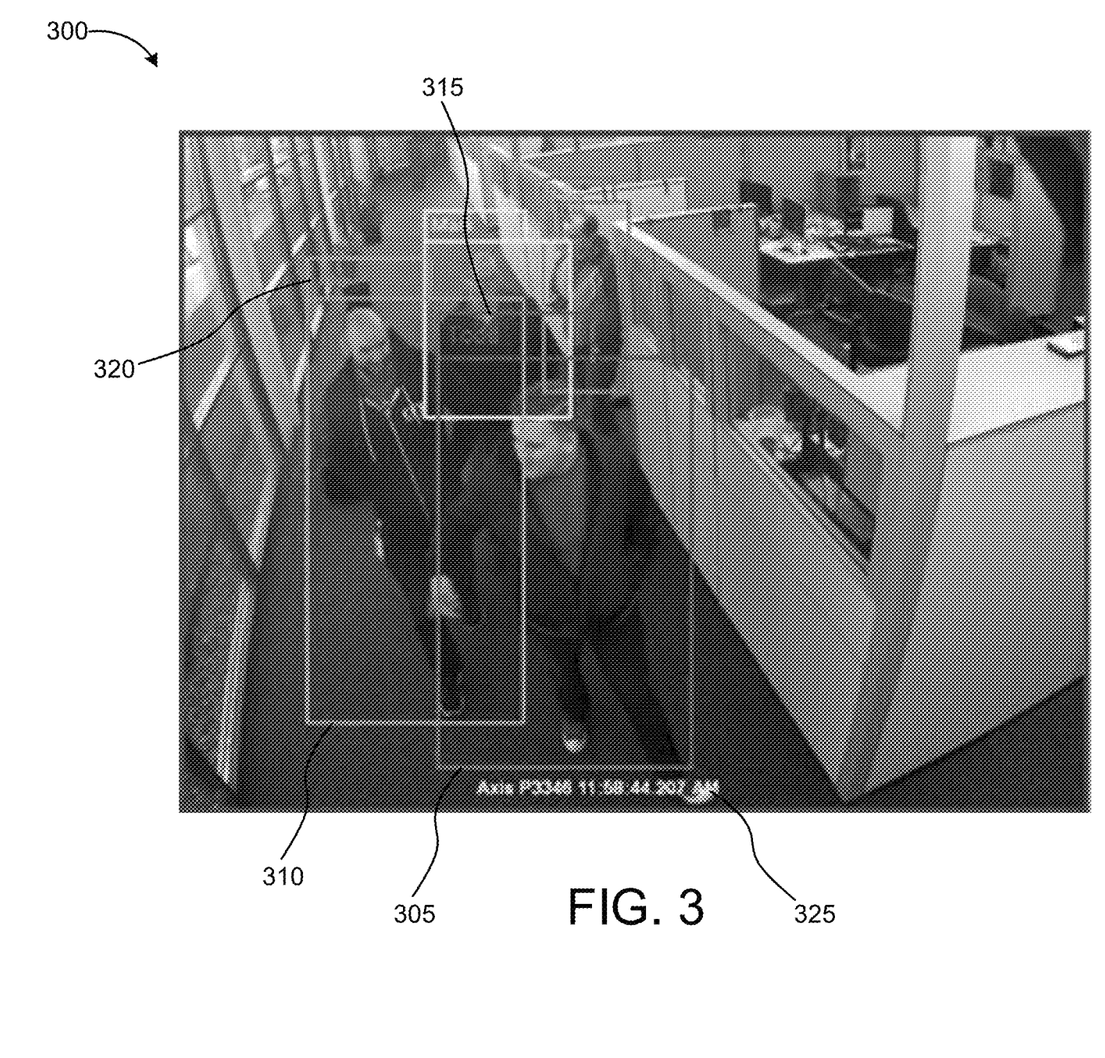
FIG. 3 is a sample annotated image that can be generated by the BMS of FIG. 2, according to some embodiments.

Referring now to FIG. 3, an image 300 from an annotated video signal is depicted. The annotated video signal 300 can be generated by the output generator 275 of the monitoring circuit 250 and displayed on the display device 290 of the user interface 280. In other instances, the image 300 is displayed and/or stored on a different device. The annotated video signal can improve building surveillance and security in a variety of scenarios. For example, if the building is a school, attendance records can be automatically generated by identifying students viewable on a video stream of an entryway. Parents or visitors can be issued an RFID tag (e.g., an identification device 215) upon check-in, and their locations can always be known within the school building. If the parents or visitors stray from an approved location, an alarm can be activated. Similarly, if an intruder that is not carrying an RFID tag or other identification device is detected on a video stream (e.g., by a facial recognition algorithm), the output generator 275 can annotate images of the intruder based on the lack of data stored in the monitoring circuit 250 usable to identify the intruder. This feature may be particularly useful in an active shooter or other emergency situation.

The image 300 can include multiple containers 305, 310 encapsulating users moving within a building space. As shown, in some instances, the containers 305, 310 can be box-shaped and sized to encapsulate a majority of each user depicted in the image 300, although the containers 305, 310 can have any desired shape (e.g., circle, oval) or size. In other instances, the users are indicated in the image 300 by flags, pins, or any other suitable graphical indication. The containers 305, 310 can be animated to move with the user as the user moves through the building space. In some instances, animation of the containers 305, 310 is aided by a position calculator contained within the output generator 275. In further instances, the position calculator can be used to anticipate the next detector 205 and image capture device 230 a user will encounter based on the user's movement through the building.

If the image 300 is a color image, the containers 305, 310 can have different colors to aid in distinguishing between users depicted in the image 300. For example, container 305 can be red, while container 310 can be orange. In some instances, the color of the containers 305, 310 can be associated with an attribute of the user. For example, a user having an acceptable security level attribute for the location of the building depicted in the image 300 could have a green container, while a user having an unacceptable security level attribute for the location of the building depicted in the image 300 could have a red container. If the image 300 is a black and white image, the containers 305, 310 can have different line weights or styles to indicate user attributes. For example, a container with a bold or dashed outline could indicate an intruder or user with an unacceptable security level.

Each of the containers 305, 310 is shown to include a metadata label 315, 320. As shown, in some instances, the labels 315, 320 are depicted as boxes connected to the containers 305, 310, although in other instances, the labels 315, 320 can have any size, shape, or orientation relative to the containers 305, 310. The labels 315, 320 can be used to display user or object attributes stored in the subject database 270 and retrieved by the output generator 275 of the monitoring circuit 250. For example, as depicted in FIG. 3, the user attribute can be a user name such that label 315 indicates that the user encapsulated by container 305 is named Todd, and the label 320 indicates that the user encapsulated by container 310 is named Joe. In other instances, the metadata labels 315, 320 could be used to display a different user/object attribute, for example, a user/object destination or user security level. In further instances, the metadata labels 315, 320 could include multiple user/object attributes that are either displayed simultaneously or one at a time, with the user viewing the image 300 able to toggle between multiple attributes through use of the user input device 285.

The image 300 can further include a time and location stamp 325. For as example, as depicted in FIG. 3, a sample time and location stamp 325 can be "Axis P3346 11:58:44.207 AM," where "Axis P3346" indicates the location of the image capture device that recorded the video stream, and "11:58:44.207 AM" indicates the time that the image was captured. In other instances, the time and location stamp 325 can include other information regarding the video stream. Although the time and location stamp 325 is depicted at the bottom of the image 300, the time and location stamp 325 could be located anywhere on the image 300. In some instances, a user might toggle the visibility of the time and location stamp 325 on and off through use of a user input device 285.

Figure 4:
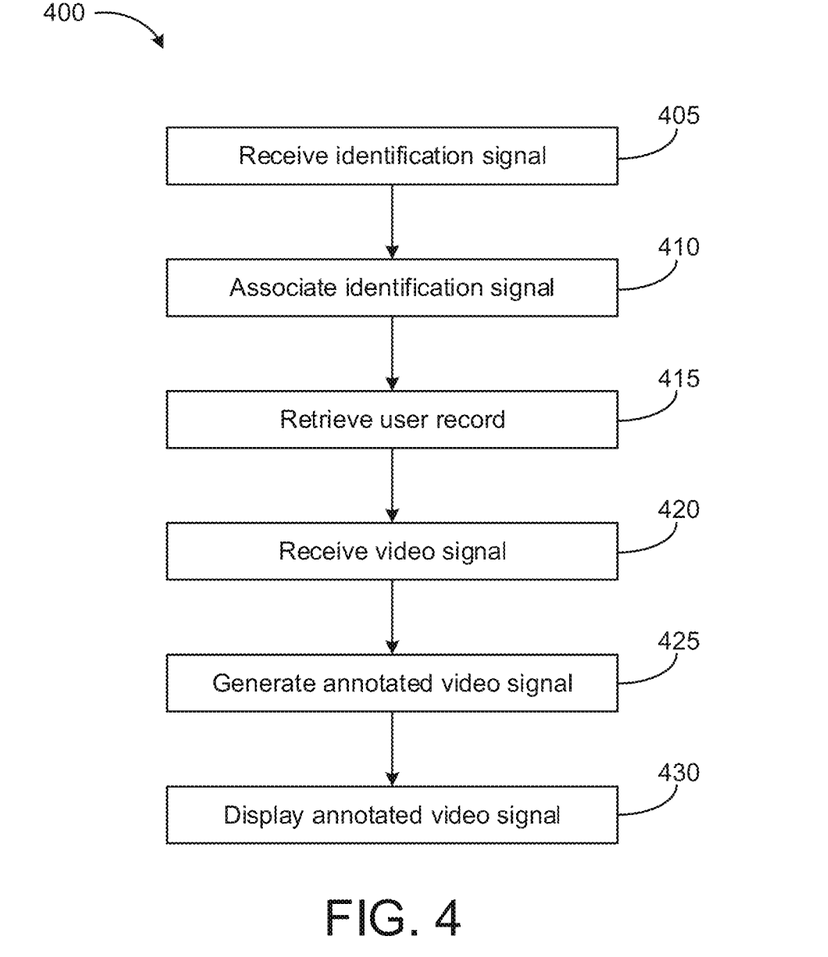
FIG. 4 is a flowchart of a process for generating an annotated video signal that can be performed by the BMS of FIG. 2, according to some embodiments.

Turning now to FIG. 4, a flow chart of a method 400 for displaying an annotated video signal is depicted. The method 400 can be performed or implemented using the components detailed above in conjunction with FIGS. 1 and 2. For example, in some instances, the method 400 is performed by the monitoring circuit 250 and the user interface 280 of the BMS 200. In other instances, the method 400 is performed by another computing system.

The method 400 can include receiving an identification signal (step 405). For example, the identification signal can be the identification signal 200 that is emitted by identification device 215 and retransmitted by the detector 205. In some instances, the detector 205 modifies the identification signal 200 before retransmission occurs. For example, the detector 205 can strip all extraneous information from the identification signal 200 other than the identifier (e.g., a user name, a user employee number, an object serial number). In some instances, the identification signal is received by the detector database 225 of the monitoring circuit 250.

The method 400 can include associating the identification signal (step 410). Associating the identification signal can include correlating the identifier with the detector record containing a detector device serial number and detector device location. In other words, associating the identification signal stores a verified location for a user or object within the building. For example, the associated record could have the form "User123—Detector12345—Exterior Door 1" to indicate that the identification device 215 of a user identified by employee number 123 was detected by a detector 205 having a serial device number 12345 that is installed near Exterior Door 1 of the building.

The method 400 can include retrieving a user record (step 415). For example, the user record can be stored in the subject database 270 and can include one or more user attributes. The subject database 270 can retrieve the user record based on the identifier received in the identification signal by the detector database 255. For example, if the identifier is employee number 123, the subject database 270 can retrieve all user attributes indexed to employee number 123. The user attributes can include, but are not limited to, the user's name, the user's likely destination within the building, a user disability status, and the user's security level.

The method 400 can include receiving a video signal (step 420). For example, the video signal can be a video stream and/or video file transmitted by the image capture device 230. In some instances, the video signal is received by the image capture device database 260 of the monitoring circuit 250. Upon receipt of the video signal at the image capture device database 260, the image capture device database 260 can store the video signal in a record with a corresponding location for the image capture device 230 so that the location of the images comprising the video signal can be easily ascertained.

The method 400 can include generating an annotated video signal (step 425). For example, the annotated video signal can include multiple images 300 encapsulating users or objects with containers 305, 310 and metadata labels 315, 320. Generating the annotated video signal can include correlating a detector record stored in the detector database 255, a user or object record stored in the subject database 270, and a video stream record stored in the image capture device database 260. For example, the correlation step can proceed as follows. A detector record can include data that indicates that employee number 123 encountered detector serial number 12345 that is positioned at Entry Door 1 at 8:00 AM. The user record can include stored attributes that indicate employee number 123 is named John Smith, works at Acme Corporation, and has a Level 1 security clearance. The video stream record can include images captured by Hallway 1 camera at 8:00 AM. By retrieving a record from the subject database 270 indicating that the Entry Door 1 is within the field of view of the Hallway 1 camera, the output generator can annotate the video stream record to encapsulate the image of John Smith in a container, labeled with his name, employer, and security level.

The annotated video signal can be generated automatically, or on demand. For example, an annotated video signal could be automatically generated for a particular location of interest within a building. For example, if a building security team wishes to monitor a particular point of entry or restricted area within a building, every user or object passing through the point of entry or restricted area can be annotated on the video stream capturing the point of entry or restricted area. In other instances, the annotated video signal can be generated to track a particular user or object as the user or object moves through the building and encounters multiple access control points 105, detectors 205, and image capture devices 230.

The method 400 can include displaying the annotated video signal (step 430). For example, the annotated video signal can be displayed on the display device 290 of the user interface 280. In other instances, the annotated video signal is displayed or stored on a different device. For example, the building in which the monitoring circuit 250 is deployed may not utilize active surveillance. Instead, the annotated video signal can be stored in an annotated video database that permits access to video signals on demand. The stored annotated video signals can be particularly useful in forensic investigations in cases of theft, personal harm, or malicious business activity where a court may require the production of evidence.

Displaying the annotated video signal can further include performance of an action based on the annotation. For example, the user interface 280 can include an alarm generator so that the audio output device 295 can emit an alarm sound, or the display device 290 can display an alert message whenever a specified alarm condition is satisfied (e.g., a user attribute retrieved from the subject database 270 indicates that a user moving through the field of view 245 of image capture device 230 does not have the appropriate security level for the building location). In further instances, the alarm generator can be configured to transmit a control signal to an access control device 120 to operate an electronic lock or an actuator and restrict the movement of a user through the building.

The construction and arrangement of the systems and methods as depicted in the various embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to various embodiments. Other substitutions, modifications, changes, and omissions can be made in the design, operating conditions and arrangement of the embodiments without departing from the scope of the present disclosure.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system to identify and track occupants of a building, comprising:
   a plurality of detector devices, each detector device of the plurality of detector devices comprising a radio frequency reader, each detector device of the plurality of detector devices to receive an identification signal from an identification device;
   a plurality of image capture devices, each of the plurality of image capture devices to output an image signal comprising a plurality of images depicting a respective monitored location of the building; and
   a processing circuit communicably coupled with the plurality of detector devices and the plurality of image capture devices, wherein the processing circuit is to:
      receive the identification signal from one of the plurality of detector devices;
      associate the detector device providing the identification signal with a detector location stored in a detector database;
      retrieve, using an identifier of the identification signal, from a user database including a plurality of user records including at least one user attribute, a selected user record corresponding to the identifier;
      identify, using the detector location, a particular image capture device of the plurality of image capture devices having a monitored location correlated with the detector location;
      receive the image signal outputted by the particular image capture device depicting the monitored location corresponding to the detector location;
      determine that a user corresponding to the identifier does not have security clearance for the monitored location;
      generate an annotated video signal comprising (i) an occupant name of the at least one user attribute of the selected user record corresponding to the identifier of the identification signal and (ii) the detector location overlaid on the image signal;
      generate the annotated video signal to include an alert responsive to determining, by the processing circuit, that the user corresponding to the identifier does not have security clearance for the monitored location;
      display the annotated video signal on a display device;
      transmit a control signal to an access control device to operate at least one of a lock or an actuator responsive to determining that the user corresponding to the identifier does not have security clearance for the monitored location.

2. The system of claim 1, wherein:
   at least one of the plurality of detector devices is located proximate the access control device.

3. The system of claim 1, wherein:
   the identifier is assigned to at least one of the identification device and a user of the identification device.

4. The system of claim 1, wherein:
   the identification signal is a radio frequency signal.

5. The system of claim 1, wherein:
   the identification device is a passive radio frequency identification (RFID) device.

6. The system of claim 1, wherein:
   the user attribute comprises the occupant name, a user destination, a user disability status, a user employment status, or a user security level.

7. The system of claim 1, wherein the detector location overlaid on the image signal comprises an identifier of the detector device providing the identification signal.

8. A computer implemented method of identifying and tracking occupants of a building, comprising:
   receiving, by one or more processors, an identification signal from one of a plurality of detectors, the identification signal comprising an identifier of at least one of an identification device and a user of the identification device;
   associating, by the one or more processors, the detector device providing the identification signal with a detector location of the building stored in a detector database;
   retrieving, by the one or more processors, a user record stored in a user database corresponding to the identifier, the user record comprising a plurality of user attributes;
   identifying, using the detector location, a particular image capture device of the plurality of image capture devices having a monitored location correlated with the detector location;
   receiving, by the one or more processors, a video signal outputted by a particular image capture device depicting the monitored location corresponding to the detector location;
   determining, by the one or more processors, that a user corresponding to the identifier does not have security clearance for the monitored location;
   generating, by the one or more processors, an annotated video signal comprising (i) an occupant name of the at least one user attribute of the selected user record corresponding to the identifier and (ii) the detector location overlaid on the image signal;
   generating, by the one or more processors, the annotated video signal to include an alert responsive to determining, by the one or more processors, that the user corresponding to the identifier does not have security clearance for the monitored location;
   displaying, by the one or more processors, the annotated video signal on a display device; and
   transmitting, by the one or more processors, a control signal to an access control device to operate at least one of a lock or an actuator responsive to determining that the user corresponding to the identifier does not have security clearance for the monitored location.

9. The method of claim 8, comprising:
   storing, by the one or more processors, the annotated video signal in an annotated video database.

10. The method of claim 8, comprising:
the annotated video signal comprising at least one of a box or a flag overlaid on a user depicted in the video signal.

11. The method of claim 8, comprising:
the plurality of user attributes comprising at least one of the occupant name, a user destination, a user disability status, a user employment status, and a user security level.

12. The method of claim 8, comprising:
generating, by the one or more processors, the alert based on at least one of the plurality of user attributes and the monitored location.

13. The method of claim 12, comprising:
transmitting, by the one or more processors, the alert to an audio output device configured to emit an audible alert.

14. A building monitoring apparatus, comprising:
a display that presents a user interface having an array of inputs; and
a monitoring circuit coupled to the display and comprising:
- a detector database configured to receive an identification signal and store location identifiers associated with a plurality of detector devices;
- an image capture database configured to receive a video signal and store location identifiers associated with a plurality of image capture devices,
- a subject database configured to extract identification data regarding a person or an object based on the identification signal; and
- an output generator configured to:
  - identify, using a particular detector location identifier of the location identifiers stored by the detector database corresponding to a particular detector device of the plurality of detectors devices from which the identification signal is received;
  - identify, using the particular detector location identifier, a particular image capture device of the plurality of image capture devices having a monitored location correlated with a detector location of the particular detector device;
  - determine that a user corresponding to the identification data does not have security clearance for the monitored location;
  - generate annotated display data comprising (i) an occupant name of the person corresponding to the identifier and (ii) the detector location that is overlaid on the video signal for the display based on the identification data, the particular detector location identifier, and an image capture device location identifier of the particular image capture device; and
  - transmit a control signal to an access control device to operate at least one of a lock or an actuator responsive to determining that the user corresponding to the identification data does not have security clearance for the monitored location.

15. The building monitoring apparatus of claim 14, wherein:
the identification data comprising a plurality of user attributes and a plurality of object attributes.

16. The building monitoring apparatus of claim 15, wherein:
the plurality of user attributes comprising at least one of the occupant name, a user destination, a user disability status, a user employment status, and a user security level.

17. The building monitoring apparatus of claim 14, wherein:
the annotated display data comprising at least one of a box or a flag overlaid on the person or the object depicted in the video signal received from at least one of the plurality of image capture devices.

\* \* \* \* \*